(12) United States Patent
Ota et al.

(10) Patent No.: US 6,737,178 B2
(45) Date of Patent: May 18, 2004

(54) COATED PCBN CUTTING TOOLS

(75) Inventors: Michiko Ota, Itami (JP); Tomohiro Fukaya, Itami (JP); Junichi Shiraishi, Itami (JP); Tetsuo Nakai, Itami (JP); Hisanori Ohara, Itami (JP); Haruyo Fukui, Itami (JP)

(73) Assignee: Sumitomo Electric Industries Ltd., Osaka (JP)

( * ) Notice: Subject to any disclaimer, the term of this patent is extended or adjusted under 35 U.S.C. 154(b) by 154 days.

(21) Appl. No.: 09/729,149

(22) Filed: Dec. 1, 2000

(65) Prior Publication Data

US 2001/0003569 A1 Jun. 14, 2001

(30) Foreign Application Priority Data

Dec. 3, 1999 (JP) .............................. 11-345490

(51) Int. Cl.[7] .................. B23B 27/14; B23P 15/28
(52) U.S. Cl. .................. 428/698; 51/307; 51/305; 407/119; 428/336; 428/325; 428/472; 428/142; 428/701; 428/702
(58) Field of Search .................. 428/698, 701, 428/702, 336, 325, 469, 472, 142; 51/307, 309; 407/119

(56) References Cited

U.S. PATENT DOCUMENTS

| | | | | |
|---|---|---|---|---|
| 4,619,698 A | * | 10/1986 | Ueda et al. | |
| 5,034,053 A | * | 7/1991 | Nakai et al. | |
| 5,340,780 A | * | 8/1994 | Sumiya | |
| 5,569,862 A | * | 10/1996 | Kuroyama et al. | |
| 5,597,272 A | * | 1/1997 | Moriguchi et al. | |
| 5,700,551 A | * | 12/1997 | Kukino et al. | |
| 5,773,140 A | * | 6/1998 | Cerutti et al. | |
| 5,853,873 A | * | 12/1998 | Kukino et al. | |
| 5,871,850 A | * | 2/1999 | Moriguchi et al. | |

FOREIGN PATENT DOCUMENTS

| CA | 2326814 | * | 5/2001 |
|---|---|---|---|
| EP | 1093875 | * | 4/2001 |
| JP | 53077811 | | 7/1978 |
| JP | 01096083 | | 4/1989 |
| JP | 01096084 | | 4/1989 |
| JP | 04-063604 | * | 2/1992 |
| JP | 06-108253 | * | 4/1994 |
| JP | 07018415 | | 1/1995 |
| JP | 08323506 | * | 12/1996 |
| JP | 09-267203 | * | 10/1997 |
| JP | 10068071 | | 3/1998 |
| JP | 10245287 | * | 9/1998 |

* cited by examiner

*Primary Examiner*—Archene Turner
(74) *Attorney, Agent, or Firm*—W. F. Fasse; W. F. Fasse

(57) ABSTRACT

A coated sintered body can be used for a cutting tool for precision machining of hardened steel. The coated PCBN cutting tool includes a substrate which contains not less than 35 volume % and not more than 85 volume % of CBN, and a hard coated layer formed on the substrate. The hard coated layer comprises at least one compound layer consisting of at least one element selected from the group 4a, 5a, and 6a elements of the periodic table and Al, and at least one element selected from C, N and O. The thickness of the layer is not less than 0.3 $\mu$m and not more than 10 $\mu$m. The center-line mean roughness of the hard coated layer is not more than 0.1 $\mu$m.

13 Claims, 3 Drawing Sheets

COATED PCBN CUTTING TOOLS

BACKGROUND OF THE INVENTION

1. Field of the Invention

The present invention relates to improvements in cutting tools using a sintered body comprising mainly cubic boron nitride (hereinafter CBN sintered body) as the substrate. A CBN sintered body means a sintered body of polycrystalline CBN and is hereinafter referred to as PCBN. In particular the invention relates to a coated PCBN cutting tool improved in wear-resistance and high accuracy machining.

2. Description of the Related Arts

Methods to coat a surface of the PCBN cutting tool with a variety of wear-resistance layers such as TiN so as to improve the wear-resistance of a CBN sintered body have been proposed (i.e. JP-A-1-96083 and JP-A-1-96084). It has also been proposed to roughen the surface of the substrate (CBN sintered body) considerably by ion etching and then to coat the roughened surface, in order to improve the adherence between the substrate and the coated layers, and the durability of the coated layer (i.e. JP-A-7-18415).

However when using a roughened surface of the substrate to improve adherence, the coated surface is also roughened and liable to peel due to increased cutting resistance.

Surface roughness of the work or workpiece depends on the shape of the end cutting edge boundary, because the shape of end cutting edge boundary is reproduced on the work. FIG. 3 is an enlarged ground plan seen from the direction of the rake face 31 when work 30 is cut by an insert.

The arrow shows the feeding direction of the insert at cutting in FIG. 3. Herein the end cutting edge boundary 33 is a portion of the cutting edge which forms the finished surface of the work. The broken line in FIG. 3 shows wear of the insert. Number 34 is the side cutting edge boundary.

When a roughly coated insert is used, the surface roughness of the work becomes rough from the early cutting stage, since the surface of the insert is reproduced on the work. Particularly when the end cutting edge boundary is unevenly worn and notch wear develops, the finished surface becomes rough within a short cutting time.

Consequently, the main object of the present invention is to provide a coated CBN sintered body for an insert which can produce high precision and high quality machining of work for a remarkably long tool life compared with the conventional insert.

SUMMARY OF THE INVENTION

The present invention is based on the knowledge that the smooth wear at the end cutting edge boundary controls increasing surface roughness of the work, enabling long tool life and high precision machining. The object of the present invention is accomplished by a coated PCBN cutting tool which has a prescribed coated material, thickness and surface roughness.

The present invention relates to a coated PCBN cutting tool and a CBN sintered body comprising 35% to 85% by volume of CBN. The hard coated layer consists of at least one element selected from a group consisting of the group IVa, Va, VIa elements of the periodic table and Al, and of at least one element selected from a group consisting of C, N and O. The thickness of the layer is preferably 0.3 $\mu$m to 10 $\mu$m. The surface roughness of the coated surface is not more than 0.2 $\mu$m Ra, which is the center-line mean roughness.

Since large particles called droplets may be contained in the hard coated layer, Ra is preferable to estimate the surface roughness of such hard coated layer. The inventors have found that the end cutting edge boundary is worn smoothly when the hard coated layer is smooth. The preceding term "smoothly worn" means controlling the flank wear and notch wear at the end cutting edge boundary.

DETAILED DESCRIPTION OF THE INVENTION (Substrate)

The CBN sintered body comprising 35% to 85% by volume of CBN is used as the substrate. The strength of the substrate is compatible with wear resistance under the condition of the above CBN content.

The binder of the substrate is comprised of at least one member selected from a group consisting of nitride, carbide, boride and oxide of IVa, Va, VIa element of the periodic table and their solid solutions and at least one member selected from a group consisting of AlN, AlB$_2$, Al$_2$O$_3$ and their solid solutions. The ingredients of the binder are selected to improve strength and wear resistance of the substrate. Needless to say, the substrate may include inevitable impurities.

Figure 1:
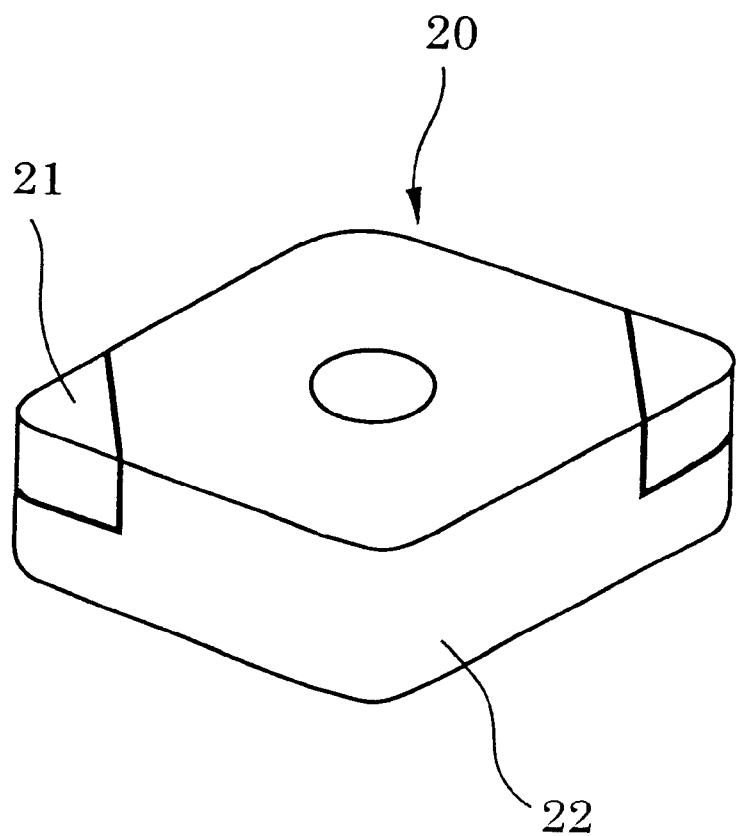
FIG. 1 is a perspective view showing the cutting tool using the CBN sintered body.
Figure 4:
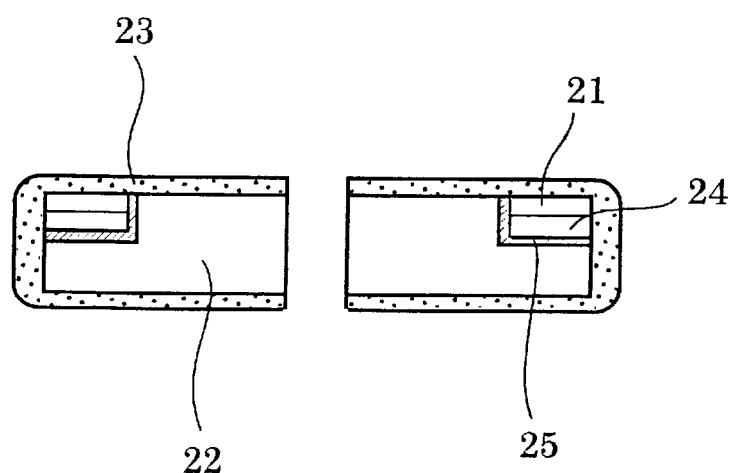
FIG. 4 is a cross section of sample No. 4-1 and 4-2 in Example 4.

The mean particle diameter of CBN included in the substrate is preferably not more than 4.0 $\mu$m. The strength of the invented material depends on the strength of the CBN sintered body. The CBN particle having a mean diameter of not more than 4.0 $\mu$m promotes a reaction with the binder material powder, increases the strength of the CBN sintered body and consequently improves the strength of the invented material. There are two substrates in this invention. The first substrate is composed solely of a CBN sintered body as shown in FIG. 1. The other is composed of a CBN sintered body and cemented carbide as shown in FIG. 4.

The substrate is preferably produced under the pressure of not less than 4 GPa and the temperature of not less than 1000° C. using a high pressure apparatus. The detailed production methods and properties of the CBN sintered body is written in JP-A-53-77811.

(Hard Coated Layer)

The hard coated layer is selected from compounds which are comprised of at least one element selected from a group consisting of IVa, Va, VIa elements of the periodic table and Al, and at least one element selected from a group consisting of C, N and O. These compounds have sufficient hardness and high wear resistance.

The inventors have found that when a work is cut by the coated PCBN cutting tool, wear occurs at the flank surface located at about the center of the end cutting edge boundary 33 and side cutting edge boundary 34 and propagates to the boundaries. Consequently the hard coated layer remains at the end cutting edge boundary. The remaining hard coated layer prevents the CBN particles and binder material particles from falling out of the CBN sintered body at the end cutting edge boundary which affects surface roughness of the work. The remaining hard coated layer also prevents the development of notch wear. Namely, the remaining hard coated layer maintains smooth wear at the end cutting edge boundary, and high precision machining for a long time.

Improved wear resistance of the invented material prevents increasing of the cutting force, waving of the work surface, peeling of the coated layer and the propagation of wear. It also improves tool life and machining accuracy.

Preferable materials for the hard coated layer are, for example, TiN, TiCN, TiAlN, $Al_2O_3$, ZrN, ZrC, CrN, VN, HfN, HfC and HfCN. The effects of "smooth wear at the end cutting edge boundary and high-precision machining" can be accomplished by the hard coated layer comprising the preferable materials. Especially the TiN or TiAlN layers remarkably improved the effects. The present invention is accomplished economically using a TiN layer as the hard coated layer.

Both single layer and multi-layers can be used as the construction of the hard coated layer. At least one layer among the multi-layers should be selected from the preferable materials in this invention.

The thickness of the coated layer is selected in a range between 0.3 $\mu$m and 10 $\mu$m. The preferable effects of smooth wear at the end cutting edge boundary cannot be obtained in a range thinner than 0.3 $\mu$m. If thicker than 10 $\mu$m, the remaining stress in the hard coated layer decreases adhesion strength between the substrate and the hard coated layer. The thickness means total thickness in the case of multi-layers.

The center-line mean roughness of the layer which is denoted by Ra is not more than 0.2 $\mu$m in this invention, and preferably not more than 0.1 $\mu$m. The center-line mean roughness of Ra is measured based on JIS B 0601 standard. The measurement length is fixed at 0.8 mm in the latter example, but the length is optional according to the measured object. When it is impossible to apply 0.8 mm to the measurement length, a shorter length than 0.8 mm can be applied as a measurement length.

It is preferable that at least one surface of both the substrate and the coated layer is polished in order to control the surface roughness of the hard coated layer in the prescribed range. Because the surface roughness of the hard coated layer depends on the surface roughness of substrate, Ra of the substrate is preferably not more than 0.2 $\mu$m so as to make Ra of the hard coated layer in the range of not more than 0.2 $\mu$m. When the surface of the substrate is more smoothly polished, the surface roughness of the hard coated layer is improved. Consequently high precision machining becomes possible using an insert having the polished substrate. The polishing method has no limitation. A separated abrasive, for example, is applied to the surface of the rotating brush, and then the brush is pushed to the surface of the substrate or the hard coated layer.

The coated layer is preferably formed on at least a part of the substrate. The coated layer is formed on at least the surface concerned with cutting. The surface concerned with cutting is at least a surface selected from the rake face, flank face and negative land face. More importantly, it is the portion from the rake face to flank face or from the rake face through the negative land face to the flank face. It is preferable especially, that the coated layer is formed at the contacted portion with the work and the adjacent areas.

An earlier coating technique can be used as a method to form the hard coated layer. The hard coated layer can be prepared by the physical vapor deposition (PVD) technique such as sputtering and ion-plating and chemical vapor deposition (CVD) technique such as plasma-CVD. Arc ion-plating method is especially preferable to form the smooth hard coated layer. The arc ion-plating method is written in JP-A-10-68071.

(Bonding Substrate to Base)

When the substrate is bonded to the base with solder, the solder preferably contains Ti and has a melting point higher than 650° C., more preferably higher than 700° C. Since the substrate of the CBN sintered body is produced by an expensive high pressure sintering apparatus, the substrate is also expensive. In order to produce an insert at low cost, it is considered that an insert is constructed by bonding the substrate and the base with solder. The substrate comprises only the portion contributing to cutting and the base comprises the remainder of an insert. In order to coat the bonded insert with a hard layer having sufficient adhesion strength, it is essential that the substrate and the base do not slide against each other during coating of a hard layer in high temperature. On the other hand, it is found that when the hard layer is coated under the temperature of not less than 650° C., more preferably not less than 700° C., the hard coated layer has sufficient adhesion strength. Therefore it is also essential that the melting point of the solder be higher than 650° C. to bond the substrate to the base. When the substrate is coated between the temperature of higher than 650° C. and lower than the melting point of the solder, sliding between the substrate and the base is also prevented. To obtain a sufficient bonding strength between the substrate and the base in such high temperature, the melting point of the solder must be higher than 700° C.

The base material is selected from a group consisting of cemented carbide, ceramic, cermet and ferrous metal. Cemented carbide is preferable for the base material because cemented carbide is a tough and high strength material.

When Ti is contained in the solder, the adhesion strength of the coated layer is improved at the bonding portion between the substrate and the base since the surface of the solder reacts with the coated layer.

As explained above, the insert of the present invention has a strong substrate, smooth coated layer and is smoothly worn at the end cutting edge boundary, therefore it is possible to use the insert in precision machining for a long tool life.

DESCRIPTION OF PREFERRED EMBODIMENT

Embodiment of the present invention is explained hereunder. The thickness of the coated layer is measured by directly observing the cross section of an insert using a Scanning Electron Microscope (SEM) in these embodiments. The present invention of the coated PCBN cutting toool is not limited to these examples.

EXAMPLE 1

Figure 2:
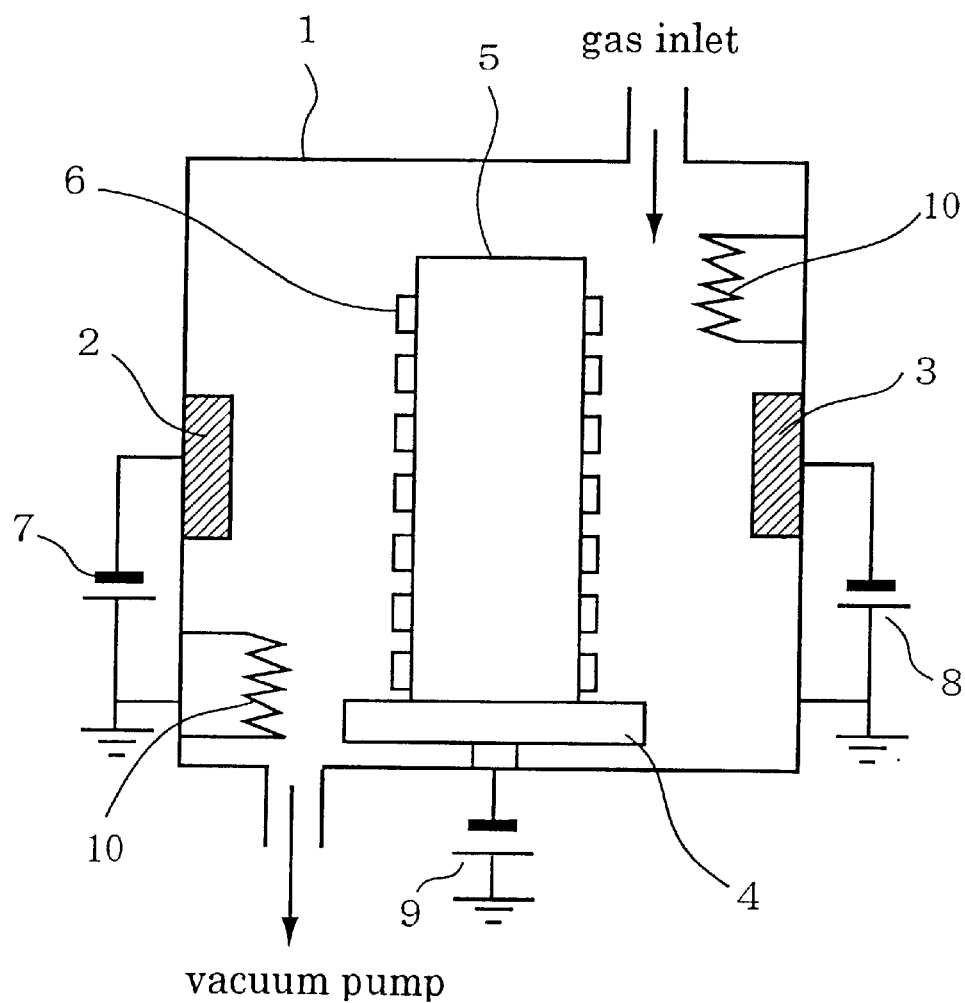
FIG. 2 illustrates an embodiment of an ion-plating apparatus for preparing the hard coated layer according to the present invention.
Figure 3:
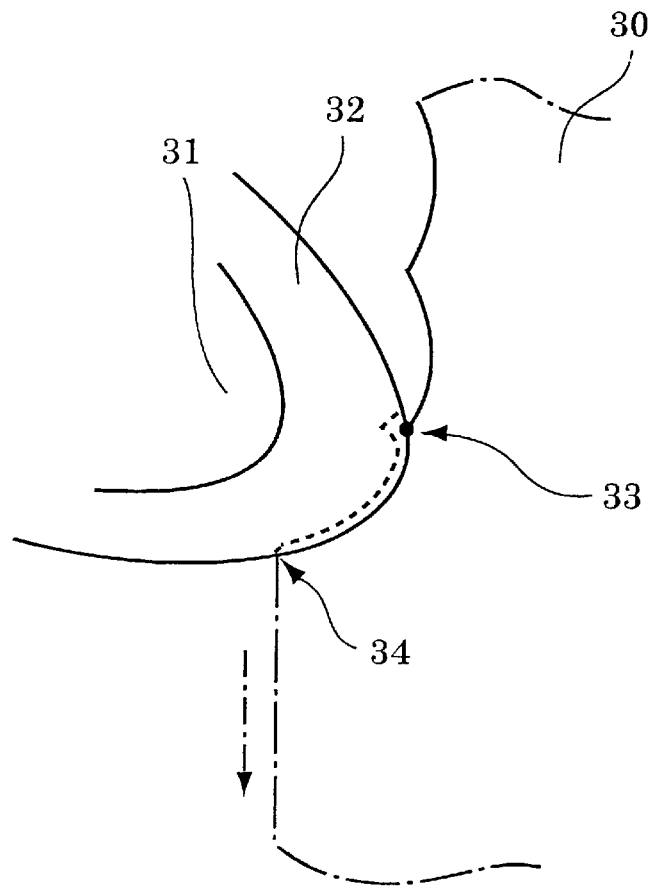
FIG. 3 is an explanatory view showing an end cutting edge and a side cutting edge.

Powders of TiN, Ti and Al were mixed using a pot and ball made of cemented carbide to obtain a binder powder. The binder powder was mixed with CEN powder and the resulting powder mixture was packed in a Mo container and sintered at 1400° C. under a pressure of 5 GPa (50 kb) for 20 minutes. The resulting sintered substrate 21 was bonded to a base 22 by solder and shaped into an insert for the cutting tool (shape of SNGN 120408) as shown in FIG. 1. The TIN layer was deposited on the surface of the insert by a known ion plating technique. The samples of Nos. 1-1 to 1-4 were prepared as shown in Table 1. FIG. 2 illustrates an embodiment of a deposition apparatus. The apparatus had a plurality of targets 2 and 3 set at opposite sides in a vacuum chamber and a table 4 having a rotating axis at the center of both targets. A cylindrical insert holder 5 was fixed on the table 4 and inserts 6 were held on the insert holder 5. The vacuum chamber had a gas inlet and a gas outlet to adjust the prescribed pressure and supply the prescribed gas. The outlet was connected to a vacuum pump.

Inserts can be heated to the prescribed temperature by heaters 10. The targets 2 and 3 are connected respectively to electrical generators 7 and B which adjust an electric discharge current for generating a vacuum-arc to vaporize the target materials of targets 2 and 3. The insert holder 5 is connected to an electrical bias generator 9 to supply a bias voltage to the substrate. After the vacuum chamber was evacuated to a pressure of $7 \times 10^{-3}$ Pa, argon (Ar) gas was introduced to create a pressure of 0.1 Pa in which the inserts were heated to 400° C. using heaters 10 and were cleaned under an electrical bias voltage of −1,000 V. Then the surfaces of the inserts were cleaned by metal ions until the temperature of the inserts increased to 500° C. with vaporizing and ionizing the metal targets 2 and 3 using vacuum-arc electrical discharge.

Then, at least one kind or more of $N_2$, $H_2$, Ar, $CH_4$, and $C_2H_2$ were introduced into the vacuum chamber 1 to keep the pressure of the chamber 1 at 2 Pa. The inserts were coated with a hard coated layer by vaporizing and ionizing the metal targets 2 and 3 using vacuum-arc discharge. Bias voltages of −20 to −500 V were applied to the insert holder.

Comparative Examples 1-5 to 1-10 which were different in coated condition and Comparative Examples 1-11 to 1-12 which were not coated, were prepared.

The surface roughness of the hard coated layer was adjusted by the degree of polishing of the substrate before coating. The substrate was polished by pushing a rotating brush on which a diamond abrasive of 5–8 $\mu$m diameter (corresponding to #2000) was applied.

The resulting inserts were evaluated by a cutting test. A round steel rod of SCM415 (JIS Standard) having a hardness of HRC61 was cut along its periphery at a cutting speed of 160 m/min, a depth of cut of 0.1 mm, and a feed rate of 0.08 mm/rev in a dry condition. Results are summarized in Table 1. The initial surface roughness of Rz ($\mu$m) is the surface roughness of the work after 1 minute of cutting. Durability of the coated layer was estimated by the time when the surface roughness of the work reached 3.2 $\mu$m Rz. Rz is ten-point mean roughness based on JIS B 0601. In Table 1 and in other sections of this specification, "3.2z" means surface roughness of 3.2 $\mu$m measured on the work as Rz.

X-ray diffraction patterns of the resulting sintered bodies revealed the existence of CBN, TiN, $TiB_2$, $(AlB_2)$, AlN and a small amount of WC and $Al_2O_3$. It was supposed that the reaction of Al and oxygen in the mixed powder created $Al_2O_3$.

Samples 1-1 to 1-4 have a smooth coated layer as shown in Table 1. The initial surface roughness of the work is good, since it is a reproduction of the inserts surface roughness. Also the coated layers have high wear resistance, therefore long duration of surface roughness and high precision machining are attained by the invention.

On the contrary, samples 1-5 and 1-6 of the Comparative Example have a rough surface roughness. The initial surface roughness of the work is rough, since it is a reproduction of the inserts surface roughness. Consequently both durations of the surface roughness are brief.

TABLE 1

| | | CBN sintered bodies | Hard coated layer | | Cutting Test | | |
| | | CBN (volume %) | Material | Surface roughness Ra ($\mu$m) | Thickness ($\mu$m) | Initial surface roughness Rz ($\mu$m) | Duration of surface (3.2z) roughness (min) | Estimation |
|---|---|---|---|---|---|---|---|---|
| Example | 1-1 | 40 | TiN | 0.15 | 3.0 | 1.32 | 60 | Good |
| | 1-2 | 55 | TiN | 0.15 | 3.0 | 1.45 | 70 | Good |
| | 1-3 | 65 | TiN | 0.11 | 3.1 | 1.35 | 75 | Good |
| | 1-4 | 75 | TiN | 0.14 | 3.0 | 1.46 | 65 | Good |
| Comparative Example | 1-5 | 55 | TiN | 0.35 | 2.9 | 2.48 | 20 | Bad |
| | 1-6 | 55 | TiN | 0.48 | 3.0 | 3.05 | 15 | Bad |
| | 1-7 | 55 | TiN | 0.18 | 10.3 | 2.10 | 35 | Not Good |
| | 1-8 | 55 | TiN | 0.16 | 0.2 | 1.47 | 45 | Not Good |
| | 1-9 | 25 | TiN | 0.16 | 3.0 | 2.05 | 10 | Bad |
| | 1-10 | 90 | TiN | 0.14 | 3.1 | 1.93 | 15 | Bad |
| | 1-11 | 55 | none | 0.12※ | 0 | 1.30 | 45 | Not Good |
| | 1-12 | 65 | none | 0.15※ | 0 | 1.41 | 40 | Not Good |

CBN sintered body: average CBN particle diameter: 1.5 $\mu$m
CBN sintered body: bonding material powder (weight %); TiN 0.7:Al = 75:25
Composition of solder (weight %): 70-Ag, 28-Cu, 2-Ti (melting point 780–800° C.)
※Surface roughness of CBN sintered bodies The coated layer of sample 1-7 of the Comparative Example is too thick, and consequently the coated layer has high stress and is liable to peel. Sample 1-8 of the Comparative Example has too thin a coated layer; consequently the coated layer has inferior wear resistance and diminished duration of surface roughness.

The amount of CBN in the substrate of sample 1-9 of the Comparative Example is too low; consequently the cutting edge is inferior in strength and liable to chip, which cause diminished duration of surface roughness.

The substrate of sample 1-10 of the Comparative Example contains too high an amount of CBN; consequently wear of the substrate propagates rapidly and causes a diminished duration of surface roughness.

Since Comparative Examples 1-11 and 1-12 have no coated layer, inferior wear resistance causes a diminished duration of surface roughness.

EXAMPLE 2

The procedure of Example 1 was repeated to prepare samples 2-1 to 2-4, 2-8 and 2-11 of the present invention.

Samples 2-2 to 2-7, 2-9, 2-10 and 2-12 of the Comparative Examples were also prepared. The contents of CBN and composition of the bonding phase in the substrate were diversified in this example.

Cutting tests were carried out under the same condition as Example 1 using resulting coated inserts. The results are shown in Table 2.

Sample Nos. 2-1 to 2-4, 2-8 and 2-11 exhibited long duration of surface roughness and can be used in precision machining, since wear and broken resistance of CBN substrate is superior.

On the other hand, the substrates of Comparative Examples of Nos. 2-5 to 2-7, 2-9, 2-10 and 2-12 were inferior in wear resistance and toughness. Therefore they

TABLE 2

|  |  | CBN sintered bodies | | | Cutting test | |
| --- | --- | --- | --- | --- | --- | --- |
|  |  | CBN (volume %) | Composition of bonding material powder (weight %) | Hard coated layer Surface roughness Ra ($\mu$m) | Duration of surface (3.2z) roughness (min) | Estimation |
| Example | 2-1 | 40 | 75: TiN0.7 25: Al | 0.15 | 60 | Good |
|  | 2-2 | 55 | 75: TiN0.7 25: Al | 0.15 | 70 | Good |
|  | 2-3 | 65 | 75: TiN0.7 25: Al | 0.11 | 75 | Good |
|  | 2-4 | 75 | 75: TiN0.7 25: Al | 0.14 | 65 | Good |
| Comparative Example | 2-5 | 25 | 75: TiN0.7 25: Al | 0.16 | 10 | Bad |
|  | 2-6 | 90 | 75: TiN0.7 25: Al | 0.14 | 15 | Bad |
|  | 2-7 | 25 | 60: TiC0.8 40: TiAl$_3$ | 0.13 | 10 | Bad |
| Example | 2-8 | 55 | 60: TiC0.8 40: TiAl$_3$ | 0.13 | 50 | Good |
| Comparative Example | 2-9 | 90 | 60: TiC0.8 40: TiAl$_3$ | 0.16 | 20 | Bad |
|  | 2-10 | 25 | 45: Co, 30: Al 13: WC. 12: TiN | 0.12 | 15 | Bad |
| Example | 2-11 | 55 | 45: Co, 30: Al 13: WC. 12: TiN | 0.13 | 40 | Good |
| Comparative Example | 2-12 | 90 | 45: Co, 30: Al 13: WC. 12: TiN | 0.17 | 30 | Not Good |

CBN sintered body: average CBN particle diameter: 1.5 ($\mu$m)
Composition of solder (weight %): 70-Ag, 28-Cu, 2-Ti (melting point 780–800° C.)
Hard coated layer: TiN
Thickness of hard coated layer: 3.0 ($\mu$m)

X-ray diffraction patterns of the resulting sintered substrate revealed the existence of CBN, TiN, TiB$_2$(AlB$_2$), AlN and a small amount of WC and Al$_2$O$_3$ in sample Nos. 2-1 to 2-4 and Comparative Examples 2-5 and 2-6. CBN, TiC, AlN, TiB$_2$, (AlB$_2$) and a small amount of WC and Al$_2$O$_3$ were found in sample 2-8 and Comparative Examples 2-7 and 2-9. Also CBN, CoWB, Co$_2$W$_2$B, AlN, AlB$_2$, TiN, WC and a small amount of Al$_2$O$_3$ were found in sample 2-11 and Comparative Examples 2-10 and 2-12. It is supposed that the reaction of Al and oxygen in the mixed powder created Al$_2$O$_3$.

had short duration of surface roughness for cutting hardened steel due to the propagation of chipping and wear.

EXAMPLE 3

Procedure of Example 1 was repeated to prepare samples of the present invention. Comparative Examples 3-5, 3-6, 3-9 and 3-10 were also prepared. Surface roughness of the substrates and mean diameter of the CBN particle contained in the substrates were diversified in this example.

TABLE 3

|  |  | CBN sintered bodies | | | Cutting test | | |
| --- | --- | --- | --- | --- | --- | --- | --- |
|  |  | Average diameter of CBN ($\mu$m) | Surface roughness Ra ($\mu$m) | Hard coated layer Surface roughness Ra ($\mu$m) | Initial surface roughness Rz ($\mu$m) | Duration of surface (3.2z) roughness (min) | Estimation |
| Example | 3-1 | 0.3 | 0.11 | 0.11 | 1.28 | 65 | Good |
|  | 3-2 | 0.8 | 0.12 | 0.14 | 1.30 | 70 | Good |
|  | 3-3 | 1.5 | 0.12 | 0.15 | 1.35 | 75 | Good |
|  | 3-4 | 3.8 | 0.13 | 0.16 | 1.34 | 65 | Good |
| Comparative Example | 3-5 | 5.0 | 0.14 | 0.25 | 1.88 | 40 | Not Good |
|  | 3-6 | 6.0 | 0.16 | 0.30 | 2.01 | 30 | Not Good |
| Example | 3-7 | 1.5 | 0.04 | 0.08 | 1.13 | 85 | Excellent |
|  | 3-8 | 1.5 | 0.08 | 0.09 | 1.17 | 80 | Excellent |

TABLE 3-continued

|  |  | CBN sintered bodies | | Cutting test | | |
| --- | --- | --- | --- | --- | --- | --- |
|  |  | Average diameter of CBN (μm) | Surface roughness Ra (μm) | Hard coated layer Surface roughness Ra (μm) | Initial surface roughness Rz (μm) | Duration of surface (3.2z) roughness (min) | Estimation |
| Comparative | 3-9 | 1.5 | 0.24 | 0.29 | 2.50 | 15 | Bad |
| Example | 3-10 | 1.5 | 0.51 | 0.56 | 3.05 | 5 | Bad |

CBN sintered body: bonding material powder (weight %) ; TiN 0.7:Al = 75:25
CBN sintered body: CBN content 55 (volume %)
Composition of solder (weight %): 70-Ag, 28-Cu, 2-Ti (melting point 780–800° C.)
Hard coated layer: TiN
Thickness of hard coated layer: 3.0 (μm)

Cutting tests were carried out under the same condition as Example 1 using the resulting coated inserts. The results are shown in Table 3.

X-ray diffraction patterns of the resulting sintered substrates revealed the existence of CBN, TiN, $TiB_2$, ($AlB_2$), AlN and a small amount of WC, $Al_2O_3$. It is considered that the $Al_2O_3$ is a compound of Al and oxygen in the mixed powders.

The results in Table 3 show the following. Samples 3-1 to 3-4 have smooth coated layers, consequently the initial surface roughness of the works which are a reproduction of the inserts, is superior.

These samples had a long duration of surface roughness 3.2z and could be used in precision machining, since the hard coated layer had high wear resistance.

The surface roughness of the substrate in samples 3-7 and 3-8 was smoother than other samples, therefore the surface roughness of the coated layer became smoother. Consequently these samples are superior in initial surface roughness, and duration of the surface roughness (3.2z) of the work is superior.

On the contrary, the surface roughness of the substrates was small in Comparative Examples of 3-5 and 3-6 which had a larger mean diameter of CBN particles, however the difference of the growth rate of the hard coated layer on CBN particles and bonding phase emerged on the layer. Therefore the surface roughness of the hard coated layer was rough and the duration of surface roughness (3.2z) was brief. The Comparative Examples 3-9 and 3-10 showed the following. When the surface roughness of the substrate was large, the surface roughness of the hard coated layer increased and the duration of surface roughness (3.2z) decreased.

EXAMPLE 4

The substrates of the samples 4-1 and 4-2 and Comparative Examples 4-3 and 4-4 were prepared. The substrates were two-layers of CBN sintered body 21 and cemented carbide 24 as shown in FIG. 4. The substrates were bonded to bases 22 using solders 25 having various compositions and melting points prior to coating with coating layers 23. Then they were coated with TiN layers 23 having 3.0 μm thickness in the same manner as Example 1. The slippage of the substrates on the bases and bonding strength of solder and coated layer were examined in this example. The results are also shown in Table 4.

X-ray diffraction patterns of the resulting sintered substrates revealed the existence of CBN, TiN, $TiB_2$, ($AlB_2$), AlN and a small amount of WC, $Al_2O_3$. It is considered that Al was oxidized and developed into $Al_2O_3$ during the process of making the binder powder and sintering the substrate.

It was found that the CBN sintered body and the base of Comparative Example 4-4 slipped at the bonding portion because the solder having a melting point of 600° C. was melted due to the rise in temperature during coating. Therefore the sample could not be used as cutting inserts. The solder used in Comparative Example 4-3 had a melting point of 650° C. and did not include Ti. Slight slippage was found at the bonding portion of the CBN substrate and base. On the other hand, there was no slippage at the bonding portion of the CBN substrate and base in samples 4-1 and 4-2 of the present invention, as they were bonded by solder having a melting point of higher than 700° C.

The coated layer was peeled at the solder area of the bonding portion between the CBN substrates and bases in the Comparative Examples 4-3 and 4-4 whose solder did not contain Ti. On the other hand, the coated layer was not peeled in the Examples 4-1 and 4-2 whose solders contained Ti, because the reaction of Ti and TiN at the surface of the solder increased the bonding strength. The greater the amount of Ti that was contained in the solder, the stronger was the adhesion of the coated layer and the solder.

TABLE 4

|  |  | Solder | | Estimation | |
| --- | --- | --- | --- | --- | --- |
|  |  | Composition of solder (weight %) | Melting point (° C.) | Slip of bonding portion | Adhesion strength between solder and coated layer |
| Example | 4-1 | 70: Ag, 28: Cu, 2: Ti | 780–800 | Excellent | Good |
|  | 4-2 | 50: Cu, 25: Ti, 25: Zr | 810–860 | Excellent | Excellent |
| Comparative | 4-3 | 49: Ag, 23: Zn, 16: | 650 | Not Good | Bad |

TABLE 4-continued

| | | Solder | | Estimation | |
| --- | --- | --- | --- | --- | --- |
| | | Composition of solder (weight %) | Melting point (° C.) | Slip of bonding portion | Adhesion strength between solder and coated layer |
| Example | 4-4 | Cu, 7.5: Mn, 4.5: Ni 40: Ag, 21.5: Zn, 19.7: Cu, 18.8: Cd | 600 | Bad | Bad |

CBN sintered body: bonding material powder (weight %); TiN0.7:Al = 75:25
CBN sintered body: CBN content 55 (volume %)
CBN sintered body: average CBN particle diameter: 1.5 μm
Hard coated layer: TiN
Thickness of hard coated layer: 3.0 (μm)

EXAMPLE 5

The procedure of Example 1 was repeated to prepare the pre-coated samples of 5-1 to 5-8. Comparative Example 5-9 which had no-coated layer was also prepared. Constructions of a coated layer such as a mono-layer and multi-layer, and composition were evaluated in Example 5. "The first layer" was located at the substrate side and "the third layer" was located at the surface side of the coated layers in Table 5.

Cutting tests were carried out under the same condition as Example 1 using the resulting inserts. The results are shown in Table 5.

X-ray diffraction patterns of the resulting sintered substrates revealed the existence of CBN, TiN, TiB$_2$, (AlB$_2$), AlN and a small amount of WC, Al$_2$O$_3$. It is considered that Al was oxidized and developed into Al$_2$O$_3$ during the process of making the binder powder and sintering the substrate.

Since all of the samples 5-1 to 5-8 had smooth coated layers as shown in Table 5, the inserts were superior in the initial surface roughness which is a reproduction of the coated layer. It was clear that these samples had a long duration of surface roughness of 3.2z and could be used in precision machining since these coated layers had high wear resistance. Since samples 5-1 to 5-5 contained at least one layer of TiN or TiAlN, wear of the coated layer was uniform and smooth. Therefore these samples had longer duration of surface roughness of 3.2z.

TABLE 5

| | | Hard coated layer | | | Cutting Test | | |
| --- | --- | --- | --- | --- | --- | --- | --- |
| | | The first layer | The second layer | The third layer | surface roughness Ra (μm) | Duration of surface (3.2z) roughness (min) | Estimation |
| Example | 5-1 | TiN (3 μm) | none | none | 0.15 | 70 | Excellent |
| | 5-2 | TiN (2 μm) | TiAlN (1 μm) | none | 0.19 | 70 | Excellent |
| | 5-3 | TiN (0.5 μm) | TiC (1 μm) | TiN (1.5 μm) | 0.14 | 75 | Excellent |
| | 5-4 | TiN (2 μm) | TiC (1 μm) | none | 0.18 | 70 | Excellent |
| | 5-5 | TiN (1 μm) | TiCN (1 μm) | TiN (1 μm) | 0.14 | 65 | Excellent |
| | 5-6 | Ti (0.5 μm) | TiC (2.5 μm) | none | 0.15 | 55 | Good |
| | 5-7 | TiN (0.5 μm) | TiAlN (2 μm) | TiCN (0.5μ) | 0.18 | 60 | Good |
| | 5-8 | Ti (0.5 μm) | TiN (0.5 μm) | TiAlN (2 μm) | 0.17 | 65 | Excellent |
| Comparative Example | 5-9 | none | none | none | 0.12※ | 45 | Not Good |

CBN sintered body: bonding material powder (weight %); TiN 0.7:Al = 75:25
CBN sintered body: CBN content 55 (volume %)
CBN sintered body: average CBN particle diameter: 1.5 μm
Composition of solder (weight %): 70-Ag, 28-Cu, 2-Ti (melting point 780–800° C.)
※Surface roughness of CBN sintered bodies

What is claimed is:
1. A coated PCBN cutting tool, comprising a substrate and a hard coated layer on said substrate
   (a) said substrate containing not less than 35 volume % and not more than 85 volume % of CBN;
   (b) said hard coated layer comprising at least one compound layer consisting of at least one element selected from a group consisting of the group 4a, 5a, and 6a elements of the periodic table and Al, and at least one element selected from a group consisting of C, N and O, and inevitable impurities;
   (c) a thickness of said hard coated layer being not less than 0.3 μm and not more than 10 μm; and
   (d) a center-line mean roughness Ra of said hard coated layer being not more than 0.2 μm.
2. The coated PCBN cutting tool as claimed in claim 1, wherein said substrate contains a bonding material comprising at least one member selected from a group consisting of nitrides, carbides, borides and oxides of the group 4a, 5a, and 6a elements of the periodic table and a solid solution thereof, and at least one member selected from a group consisting of AlN, AlB$_2$, Al$_2$O$_3$ and their solid solutions.
3. The coated PCBN cutting tool as claimed in claim 1, wherein said CBN in said substrate comprises CBN particles having a mean diameter of not more than 4.0 μm.

4. The coated PCBN cutting tool as claimed in claim 1, further comprising a base and a solder, wherein said substrate is bonded to said base with said solder; said base is at least one member selected from a group consisting of cemented carbide, ceramics, cermet and iron group metals; and said solder contains Ti and has a melting point of higher than 650° C.

5. The coated PCBN cutting tool as claimed in claim 1, wherein said hard coated layer includes at least a layer of TiN.

6. The coated PCBN cutting tool as claimed in claim 1, wherein said hard coated layer includes at least a layer of TiAlN.

7. The coated PCBN cutting tool as claimed in claim 1, wherein said center-line mean roughness of said hard coated layer is not more than 0.1 $\mu$m.

8. The coated PCBN cutting tool as claimed in claim 1, wherein said center-line mean roughness of said hard coated layer is at least 0.11 $\mu$m.

9. The coated PCBN cutting tool as claimed in claim 1, wherein said center-line mean roughness of said hard coated layer is greater than 0.1 $\mu$m.

10. The coated PCBN cutting tool as claimed in claim 1, wherein said center-line mean roughness of said hard coated layer is at least 0.08 $\mu$m.

11. The coated PCBN cutting tool as claimed in claim 1, wherein said center-line mean roughness of said hard coated layer is greater than 0.05 $\mu$m.

12. The coated PCBN cutting tool as claimed in claim 1, wherein said substrate consists of a CBN sintered body containing said CBN.

13. The coated PCBN cutting tool as claimed in claim 1, wherein said substrate comprises a cemented carbide body, and a CBN sintered body that contains said CBN and that is arranged on said cemented carbide body.

* * * * *

UNITED STATES PATENT AND TRADEMARK OFFICE
CERTIFICATE OF CORRECTION

PATENT NO.    : 6,737,178 B2
DATED         : May 18, 2004
INVENTOR(S)   : Ota et al.

It is certified that error appears in the above-identified patent and that said Letters Patent is hereby corrected as shown below:

Title page,
Item [*] Notice, should read:
-- [*] Notice: Subject to any disclamer, the term of this patent is extended or adjusted under 35 U.S.C. 154(b) by 137 days. --
Item [56], References Cited, FOREIGN PATENT DOCUMENTS, following line 12, insert:
-- PCT  WO98/28464   07/1998
EP     0,695,731    02/1996
EP     0,701,982    03/1996
EP     0,709,353    05/1996
EP     0,852,167    07/1998
EP     1,186,580    03/2002
EP     1,195,452    04/2002 --.
Item [74], *Attorney, Agent, or Firm*, replace "W. F. Fasse; W. F. Fasse" by -- W. F. Fasse; W. G. Fasse --.

Column 4,
Line 59, after "with", replace "CEN" by -- CBN --;
Line 65, after "The", replace "TIN" by -- TiN --.

Column 5,
Line 10, after "and", replace "B" by -- 8 --;
Line 59, after "of", replace "5-8 $\mu$m" by -- 5~8 $\mu$m --.

Column 7,
Table 2, under the heading "Composition of bonding material powder (weight %)", lines 20, 22 and 24, replace "WC." by -- WC, --.

UNITED STATES PATENT AND TRADEMARK OFFICE
CERTIFICATE OF CORRECTION

PATENT NO. : 6,737,178 B2
DATED : May 18, 2004
INVENTOR(S) : Ota et al.

It is certified that error appears in the above-identified patent and that said Letters Patent is hereby corrected as shown below:

Column 12,
Table 5, under the heading "The third layer", line 7, replace "(0.5$\mu$" by -- (0.5$\mu$m) --.

Signed and Sealed this

Fifth Day of July, 2005

JON W. DUDAS
*Director of the United States Patent and Trademark Office*